US009106296B2

(12) United States Patent
Naguib

(10) Patent No.: US 9,106,296 B2
(45) Date of Patent: Aug. 11, 2015

(54) BEAM SPACE TIME CODING AND TRANSMIT DIVERSITY

(75) Inventor: Ayman Fawzy Naguib, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 661 days.

(21) Appl. No.: 11/684,527

(22) Filed: Mar. 9, 2007

(65) Prior Publication Data

US 2008/0144738 A1 Jun. 19, 2008

Related U.S. Application Data

(60) Provisional application No. 60/870,653, filed on Dec. 19, 2006.

(51) Int. Cl.
*H04L 27/00* (2006.01)
*H04B 7/06* (2006.01)
*H04L 1/06* (2006.01)

(52) U.S. Cl.
CPC ............ *H04B 7/0667* (2013.01); *H04B 7/0617* (2013.01); *H04L 1/0625* (2013.01); *H04B 7/0669* (2013.01); *H04B 7/0671* (2013.01)

(58) Field of Classification Search
CPC ... H04L 7/0617; H04L 7/0667; H04L 7/0669; H04L 7/0671; H04L 1/0026; H04L 1/0625
USPC ......... 375/146, 219, 259, 260, 267, 347, 299; 455/69, 73, 101, 272, 446, 562.1
See application file for complete search history.

(56) References Cited

U.S. PATENT DOCUMENTS 6,385,181 B1 5/2002 Tsutsui et al.
2002/0150065 A1* 10/2002 Ponnekanti .................. 370/334
(Continued)

FOREIGN PATENT DOCUMENTS

CN 1710825 A 12/2005
EP 1229669 8/2002
(Continued)

OTHER PUBLICATIONS

Li Liu et al: "Combining beamforming and quasi-orthogonal space-time block coding using channel mean feedback" GLOBECOM'03. 2003—IEEE Global Telecommunications Conference. Conference Proceedings. San Frnacisco, Dec. 1-5, 2003, IEEE Global Telecommunications Conference, New York, NY: IEEE, US, vol. vol. 7 of 7, Dec. 1, 2003, pp. 1925-1930, XP010677698.
(Continued)

*Primary Examiner* — Syed Haider
(74) *Attorney, Agent, or Firm* — Howard Seo

(57) ABSTRACT

Methods and apparatus for increasing diversity gain at a receiver by applying beamforming to transmit diversity space-time coded signals. Transmit diversity can be provided at a signal source by space-time coding the signal. A transmit signal is space-time coded over a plurality of space-time antenna groups, with each space-time antenna group associated with a specific space-time code. The signal at each space-time antenna group is beamformed over the plurality of antenna in the space-time antenna group. Each of the plurality of antenna in a space-time antenna group is weighted with a distinct weight, relative to the other antenna in the space-time group. Each weight can have a distinct amplitude, phase, or combination of amplitude and phase. The weights can be static or dynamic. The dynamic weights can vary amplitude, phase, or a combination of amplitude and phase of each weight over time.

23 Claims, 6 Drawing Sheets

(56) References Cited

U.S. PATENT DOCUMENTS

| | | | |
|---|---|---|---|
| 2003/0026348 A1* | 2/2003 | Llang et al. | 375/267 |
| 2003/0181170 A1* | 9/2003 | Sim | 455/101 |
| 2004/0071222 A1 | 4/2004 | Liang et al. | |
| 2005/0030891 A1 | 2/2005 | Stephens et al. | |
| 2005/0117660 A1 | 6/2005 | Vialle et al. | |
| 2005/0157683 A1* | 7/2005 | Ylitalo et al. | 370/334 |
| 2005/0157807 A1* | 7/2005 | Shim et al. | 375/267 |
| 2005/0195912 A1 | 9/2005 | Kim et al. | |
| 2006/0030364 A1* | 2/2006 | Olesen et al. | 455/562.1 |
| 2006/0098754 A1 | 5/2006 | Kim et al. | |
| 2006/0120477 A1* | 6/2006 | Shen et al. | 375/267 |
| 2006/0153062 A1* | 7/2006 | Tanabe et al. | 370/208 |
| 2006/0256886 A1* | 11/2006 | Har et al. | 375/260 |
| 2007/0147543 A1* | 6/2007 | Horng et al. | 375/299 |

FOREIGN PATENT DOCUMENTS

| | | |
|---|---|---|
| JP | S58009441 | 1/1983 |
| JP | 9307335 A | 11/1997 |
| JP | 2001111464 A | 4/2001 |
| JP | 2002314483 A | 10/2002 |
| JP | 2003500977 A | 1/2003 |
| JP | 2003244046 A | 8/2003 |
| JP | 200338781 A | 11/2003 |
| JP | 2004064108 A | 2/2004 |
| JP | 2004507151 A | 3/2004 |
| JP | 2004201337 A | 7/2004 |
| JP | 2005503045 A | 1/2005 |
| JP | 2006060807 A | 3/2006 |
| JP | 2006196978 A | 7/2006 |
| RU | 2139636 C1 | 10/1999 |
| WO | WO9535616 A1 | 12/1995 |

OTHER PUBLICATIONS

Katz M et al: "Extension of Space-Time Coding to Beamforming WCDMA Base Stations" VTC 2000—Spring. 2000 IEEE 51st. Vehicular Technology Conference Proceedings. Tokyo. Japan, May 15-18, 2000, IEEE Vehicular Technology Conference, New York, NY: IEEE, US, vol. vol. 2 of 3. Conf. 51. May 15, 2000, pp. 1230-1234, XP000968066.

International Search Report—PCT/US07/087970, International Search Authority—European Patent Office—Apr. 17, 2008.

S. Conversy and J-D. Fekete: "The svgl toolkit. enabling fast rendering of rich 2D graphics" Technical Report—Ecole Des Mines De Nantes, No. 02/01/info, 2002, pp. 1-11, XP002539626 France.

Written Opinion—PCT/US2007/087970, International Search Authority, European Patent Office, Apr. 17, 2008.

Taiwan Search Report—TW096148805—TIPO—Jun. 27, 2011.

* cited by examiner

BEAM SPACE TIME CODING AND TRANSMIT DIVERSITY

CLAIM OF PRIORITY UNDER 35 U.S.C. §119

The present Application for Patent claims priority to Provisional Application No. 60/870,653 entitled "BEAM SPACE TIME CODING AND TRANSMIT DIVERSITY" filed Dec. 19, 2006, and assigned to the assignee hereof and hereby expressly incorporated by reference herein.

BACKGROUND OF THE DISCLOSURE

Wireless communication devices are configured to operate in a variety of operating conditions and operating environments. A mobile wireless device can experience drastic changes in signal quality based on its location relative to the transmitting signal source. The variations in signal quality can be characterized by changes in the wireless channel linking the transmitter to the wireless receiver.

There are many factors that contribute to the wireless channel. For example, received signal strength decreases as the distance between the transmitter and receiver increases. Additionally, variations in the terrain and the presence of obstructions and reflective surfaces contributes to multipath. The signals traversing the multiple signal paths from the transmitter to a receiver can constructively or destructively combine. Destructive signal combination due to, for example, a phase rotation in a multi-path signal component can result in substantially reduced signal quality at the receiver. A reduced signal quality is often referred to as a signal fade, or simply, a fade.

Wireless communication systems can implement a variety of techniques to compensate for the probability of operating in a deep fade. A wireless communication system can implement signal diversity to help compensate for fades. Diversity refers generally to implementing some type of redundancy to provide or resolve independent signal paths.

A transmitter can provide diversity by introducing a distinct resolvable signal, such that a receiver has an increased probability of receiving and resolving the transmitted signal. The transmitter can introduce diversity using a plurality of transmit antennas, a plurality of transmit frequencies, a plurality of transmit times, or some combination thereof.

For example, transmit diversity can achieved by sending an original information symbol from one antenna and sending a modified version of that symbol from a second antenna. The modified version of the original symbol can refer to a version of the original symbol that is delayed, conjugated, negated, rotated, and the like, or a combination of some or all the above. A rotated signal refers to a complex rotation of the signal phase relative to a reference. The receiver process the total received signal over one or more symbol periods to recover the transmitted symbol.

Similarly, a receiver can provide a limited amount of diversity through the use of multiple receive antennas that are spatially diverse. Preferably, the multiple receive antennas are spaced at a distance that enables each antenna to experience channel characteristics that are independent of the channel experienced by the other receive antennas.

BRIEF SUMMARY OF THE DISCLOSURE

Methods and apparatus for increasing diversity gain at a receiver by applying beamforming to transmit diversity space-time coded signals. Transmit diversity can be provided at a signal source by space-time coding the signal. A transmit signal is space-time coded over a plurality of space-time antenna groups, with each space-time antenna group associated with a specific space-time code. The signal at each space-time antenna group is beamformed over the plurality of antenna in the space-time antenna group. Each of the plurality of antenna in a space-time antenna group is weighted with a distinct weight, relative to the other antenna in the space-time group. Each weight can have a distinct amplitude, phase, or combination of amplitude and phase. The weights can be static or dynamic. The dynamic weights can vary amplitude, phase, or a combination of amplitude and phase of each weight over time.

Aspects of the disclosure include a transmitter system that includes a transmitter configured to generate a transmit signal stream, a transmit diversity encoder configured to receive the transmit signal stream and configured to generate a plurality, G, of transmit diversity/space-time encoded transmit streams from the transmit signal stream, and a plurality of beamforming encoders, each of the plurality of beamforming encoders configured to receive one of the plurality of transmit diversity/space-time encoded transmit streams and generate a plurality, K, of weighted substreams to beamform the one of the plurality of transmit diversity/space-time encoded transmit streams.

Aspects of the disclosure include a method of introducing transmit diversity. The method includes generating a transmit stream, dividing the transmit stream into a plurality of G signal streams, transmit diversity/space-time encoding the G signal streams, beamforming each of the G signal streams over K antennas, and transmitting the G beamformed signals.

Aspects of the disclosure include a transmitter system that includes means for generating a transmit stream, means for transmit diversity/space-time encoding the transmit stream to generate G encoded transmit streams, means for beamforming each of the G encoded transmit streams to generate G beamformed groups, and a plurality of antennas for transmitting the G beamformed groups.

Aspects of the disclosure include computer-readable medium encoded with a computer program to perform the steps that include receiving a transmit stream, transmit diversity/space-time encoding the G signal streams, and weighting each of the G signal streams with a corresponding complex weight vector to beamform each of the G signal streams.

BRIEF DESCRIPTION OF THE DRAWINGS

The features, objects, and advantages of embodiments of the disclosure will become more apparent from the detailed description set forth below when taken in conjunction with the drawings, in which like elements bear like reference numerals.

DETAILED DESCRIPTION OF THE DISCLOSURE

Methods and apparatus are described for generating and transmitting wireless signals that combine the benefits of transmit diversity/space-time coding and beamforming. A transmitter is equipped with N transmit antennas. The N transmit antennas are then divided into G groups of antennas where G≤N. In each group of antennas, the antennas are weighted by a weight vector $w_g = [w_{g1} \ w_{g2} \ \ldots \ w_{g,N/G}]$ to form a beam.

The information stream that needs to be transmitted is initially transmit diversity/space-time encoded into G substreams. Each of the substreams is beamformed and transmitted using one group of antennas.

Figure 1:
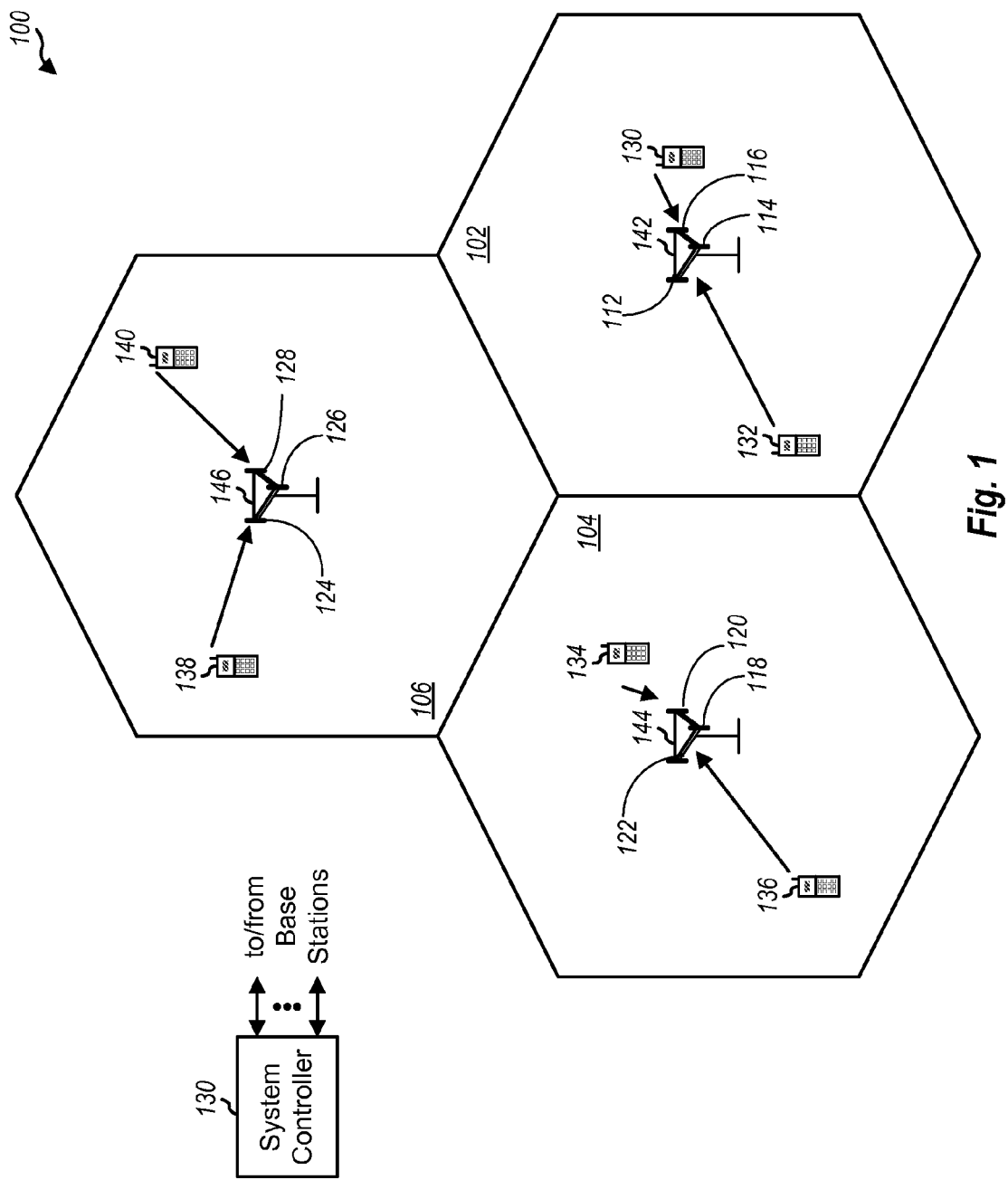
FIG. 1 is a simplified functional block diagram of an embodiment of a wireless communication system.

FIG. 1 is a simplified functional block diagram of an embodiment of a multiple access wireless communication system 100. A multiple access wireless communication system 100 includes multiple cells, e.g. cells 102, 104, and 106. In the embodiment of FIG. 1, each cell 102, 104, and 106 may include an access point 150 that includes multiple sectors.

The multiple sectors are formed by groups of antennas each responsible for communication with access terminals in a portion of the cell. In cell 102, antenna groups 112, 114, and 116 each correspond to a different sector. For example, cell 102 is divided into three sectors, 120a-102c. A first antenna 112 serves a first sector 102a, a second antenna 114 serves a second sector 102b, and a third antenna 116 serves a third sector 102c. In cell 104, antenna groups 118, 120, and 122 each correspond to a different sector. In cell 106, antenna groups 124, 126, and 128 each correspond to a different sector.

Each cell is configured to support or otherwise serve several access terminals which are in communication with one or more sectors of the corresponding access point. For example, access terminals 130 and 132 are in communication with access point 142, access terminals 134 and 136 are in communication with access point 144, and access terminals 138 and 140 are in communication with access point 146. Although each of the access points 142, 144, and 146 is shown to be in communication with two access terminals, each access point 142, 144, and 146 is not limited to communicating with two access terminals and may support any number of access terminals up to some limit that may be a physical limit, or a limit imposed by a communications standard.

As used herein, an access point may be a fixed station used for communicating with the terminals and may also be referred to as, and include some or all the functionality of, a base station, a Node B, or some other terminology. An access terminal (AT) may also be referred to as, and include some or all the functionality of, a user equipment (UE), a user terminal, a wireless communication device, a terminal, a mobile terminal, a mobile station or some other terminology.

It can be seen from FIG. 1 that each access terminal 130, 132, 134, 136, 138, and 140 is located in a different portion of it respective cell than each other access terminal in the same cell. Further, each access terminal may be a different distance from the antenna groups corresponding to the access point with which it is communicating. Both of these factors provide situations, in addition to environmental and other conditions in the cell, to cause different channel conditions to be present between each access terminal and the antenna group corresponding to the access point with which it is communicating.

Each access terminal, for example 130, typically experiences unique channel characteristics not experienced by any other access terminal because of the varying channel conditions. Furthermore, the channel characteristics change over time and vary due to changes in location. The access points, e.g. 142, 144, and 146, can be configured to implement dynamically varying antenna weighting of the antennas in each antenna group in order to improve the signal diversity experienced at the access terminals, 130, 132, 134, 136, 138, and 140.

Figure 2:
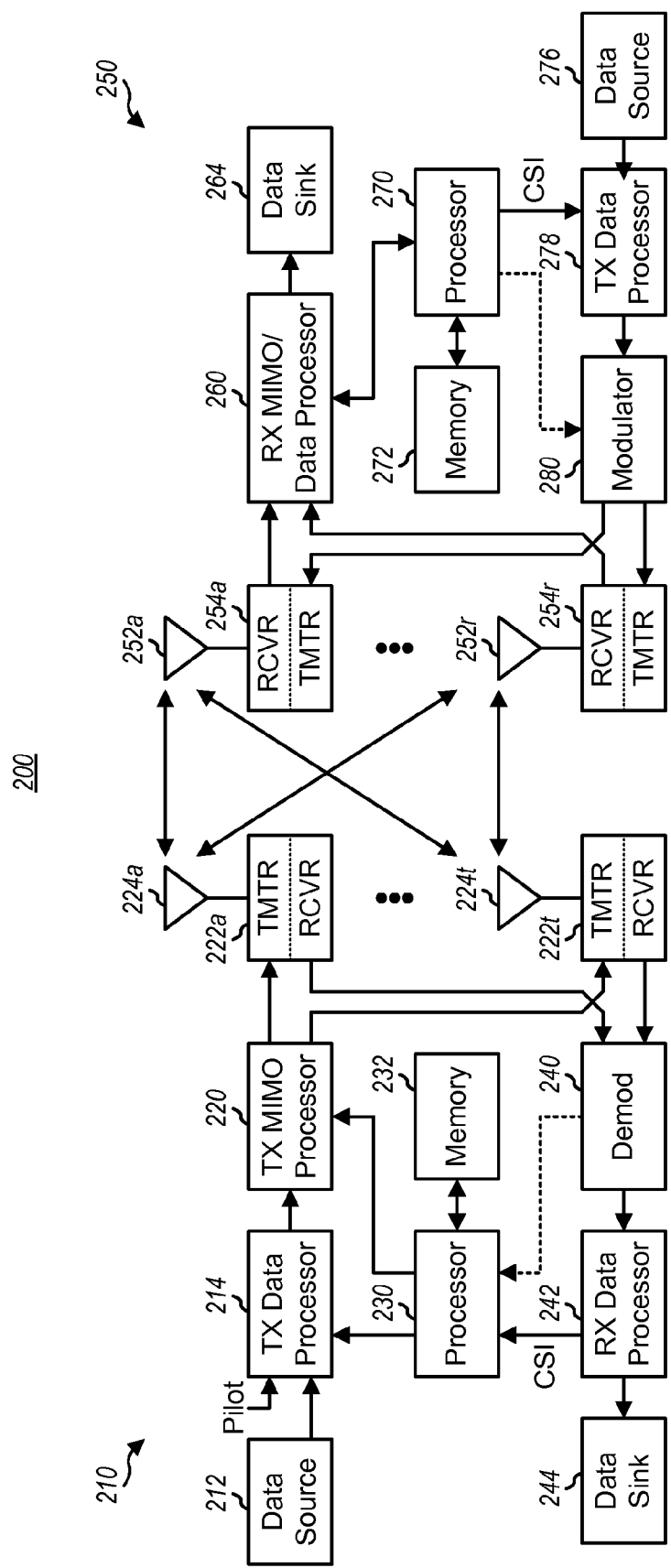
FIG. 2 is a simplified functional block diagram of an embodiment of a transmitter and receiver in a multiple access wireless communication system

The above embodiments can be implemented utilizing transmit (TX) processor 220 or 260, processor 230 or 270, and memory 232 or 272, as shown in FIG. 2. The processes may be performed on any processor, controller, or other processing device and may be stored as computer readable instructions in a computer readable medium as source code, object code, or otherwise.

FIG. 2 is a simplified functional block diagram of an embodiment of a transmitter and receiver in a multiple access wireless communication system 200. At transmitter system 210, traffic data for a number of data streams is provided from a data source 212 to a transmit (TX) data processor 214. In an embodiment, each data stream is transmitted over a respective transmit antenna. TX data processor 214 formats, codes, and interleaves the traffic data for each data stream based on a particular coding scheme selected for that data stream to provide coded data. In some embodiments, TX data processor 214 applies beamforming weights to the symbols of the data streams based upon the user to which the symbols are being transmitted and the antenna from which the symbol is being transmitted. In some embodiments, the beamforming weights may be generated based upon channel response information that is indicative of the condition of the transmission paths between the access point and the access terminal. Further, in those cases of scheduled transmissions, the TX data processor 214 can select the packet format based upon rank information that is transmitted from the user.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions provided by processor 230. In some embodiments, the number of parallel spatial streams may be varied according to the rank information that is transmitted from the user.

The modulation symbols for all data streams are then provided to a TX MIMO processor 220, which may further process the modulation symbols (for example, for OFDM). TX MIMO processor 220 then provides $N_T$ symbol streams to $N_T$ transmitters (TMTR) 222a through 222t. TX MIMO processor 220 applies beamforming weights to the symbols of the data streams based upon the user to which the symbols are being transmitted and the antenna from which the symbol is being transmitted from that users channel response information.

Each transmitter 222a through 222t receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide the rank number of "detected" symbol streams. The processing by RX data processor 260 is described in further detail below. Each detected symbol stream includes symbols that are estimates of the modulation symbols transmitted for the corresponding data stream. RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

The channel response estimate generated by RX processor 260 may be used to perform space, space/time processing at the receiver, adjust power levels, change modulation rates or schemes, or other actions. RX processor 260 may further estimate the signal-to-noise-and-interference ratios (SNRs) of the detected symbol streams, and possibly other channel characteristics, and provides these quantities to a processor 270.

At the receiver, various processing techniques may be used to process the $N_R$ received signals to detect the $N_T$ transmitted symbol streams. These receiver processing techniques may be grouped into two primary categories (i) spatial and space-time receiver processing techniques (which are also referred to as equalization techniques); and (ii) "successive nulling/equalization and interference cancellation" receiver processing technique (which is also referred to as "successive interference cancellation" or "successive cancellation" receiver processing technique).

A MIMO channel formed by the $N_T$ transmit and $N_R$ receive antennas may be decomposed into $N_S$ independent channels, with $N_S \leq \min\{N_T, N_R\}$. Each of the $N_S$ independent channels may also be referred to as a spatial subchannel (or a transmission channel) of the MIMO channel and corresponds to a dimension.

Figure 3:
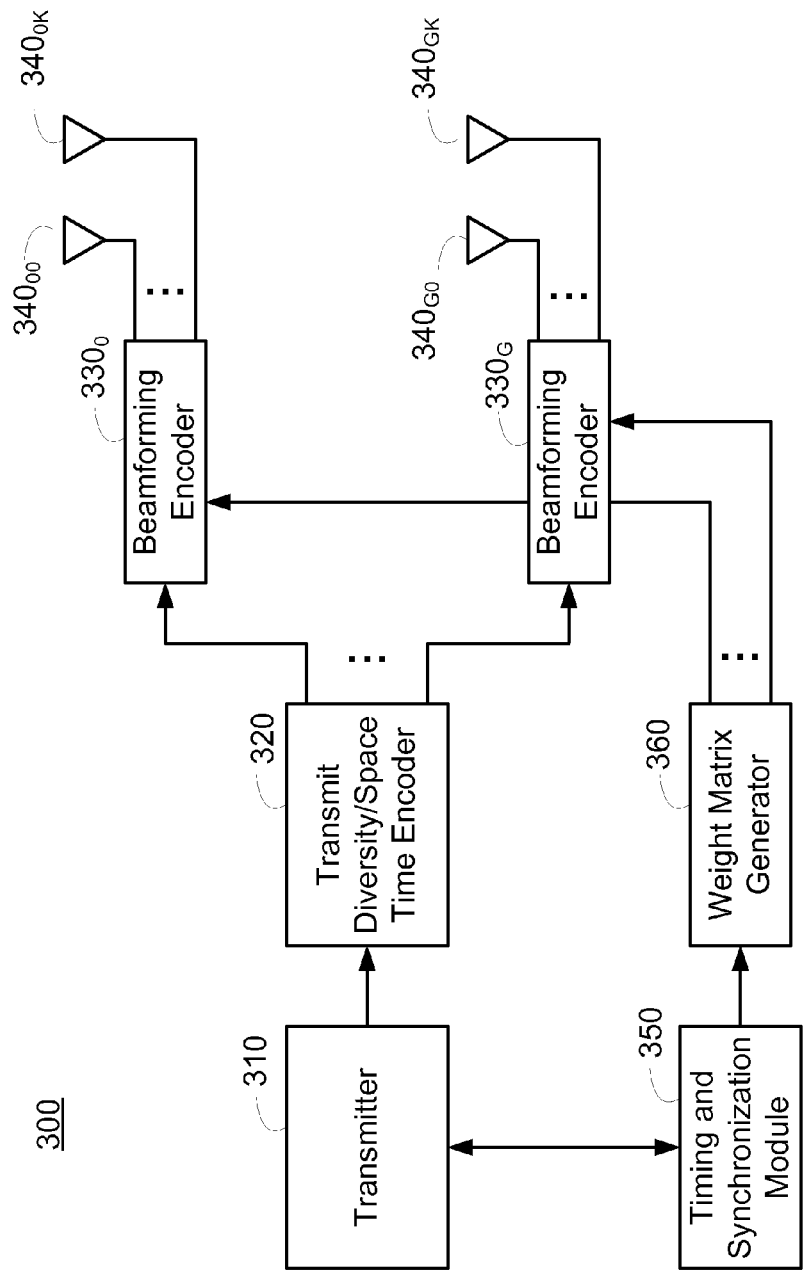
FIG. 3 is a simplified functional block diagram of an embodiment of a transmitter system having beamformed space-time coding transmit diversity.

FIG. 3 is a simplified functional block diagram of an embodiment of a transmitter system 300 implementing beamforming of space time encoded signals. The simplified functional block diagram of FIG. 3 is limited to the portion of the transmitter system that is related to beamforming space-time encoded signals. Other portions of the transmitter system are omitted for purposes of brevity and clarity. The transmitter system 300 can be integrated in, for example, the base station of the communication system of FIG. 1, and can be an embodiment of the transmitter system of FIG. 2.

The transmitter system 300 can be configured to implement beamforming of space time encoded signals for all access terminals in its coverage area. Alternatively, the transmitter system 300 can be configured to implement a plurality of distinct beamforming of space time encoded signals when there are a plurality of access terminals in its coverage area. For example, the transmitter system 300 can apply distinct weights to the antennas for each access terminal in its coverage area. In another embodiment, the transmitter system 300 can apply distinct weights to the antennas for groups of access terminals in its coverage area, where each group can be a subset of the entirety of the access terminals in its coverage area.

The transmitter system 300 includes a transmitter 310 coupled to a transmit diversity/space-time encoder 320. The transmit diversity/space-time encoder 320 couples a plurality of encoded signals to a plurality of beamforming encoders $330_0$-$330_G$. The beamforming encoders $330_0$-$330_G$ couple the beamformed signals to a plurality of antennas $340_{00}$-$340_{GK}$. A timing and synchronization module 350 is coupled to a weight matrix generator 360 that is coupled to the plurality of beamforming encoders $330_0$-$330_G$.

The transmitter 310 is configured to process the samples to generate a modulated signal stream. For example, the transmitter 310 can be configured to generate a plurality of samples of an Orthogonal Frequency Division Multiplex (OFDM) symbol from a plurality of information bits. The transmitter 310 can be configured to map the information bits to the various subcarriers of the OFDM symbol, and modulate the information bits onto the subcarriers according to a predetermined modulation format. The transmitter 310 can frequency convert the OFDM symbol to a desired RF transmit frequency. The output of the transmitter 310 in such an embodiment is a serial signal stream of the samples of the OFDM symbol at the desired transmit RF frequency.

The output of the transmitter 310 is coupled to a time diversity/space-time encoder 320. The time diversity/space-time encoder 320 is configured to divide the signal stream from the transmitter 310 into a plurality, G, of signal streams. The time diversity/space time encoder 320 operates on the plurality of signal streams to produce modified versions of the signal streams. For example, the time diversity/space-time encoder 320 can be configured to pass one substantially unmodified signal stream and can be configured to modify each of the remaining G-1 signal streams. Generally, one signal stream can be considered to be unmodified, because all signal streams can be normalized to a particular signal stream.

The time diversity/space-time encoder 320 can be configured to, for example, delay, negate, conjugate, rotate, and the like, or some combination thereof, each of the G-1 signal streams. The time diversity/space-time encoder 320 can introduce delay to a particular signal stream using a variable delay, a delay line, tapped delay line, digital delay, and the like, or some combination of delay elements. The time diversity/space-time encoder 320 can be configured to negate a signal stream using, for example, an inverting amplifier. The time diversity/space-time encoder 320 can be configured to conjugate the a signal stream using, for example, a rotator, an inverter coupled to a quadrature phase signal component, and the like, or some combination thereof. Additionally, the time diversity/space-time encoder 320 can be configured to rotate a signal stream using one or more multipliers operating on in-phase and quadrature signal components, one or more multipliers weighting the phase component, delay elements, and the like, or some combination thereof.

Typically, the time diversity/space-time encoder 320 performs a distinct modification on each of the signal streams, such that transmit diversity can be achieved by transmitting the plurality of G signal streams over a plurality, G, of distinct antennas. In a typical time diversity/space time encoded system, the plurality of G antennas can be separated spatially. In the embodiment of FIG. 3, each of the G distinct time diversity/space time encoded signal streams is subjected to additional processing.

Another manner of providing diversity gain at the receiver is by using transmit beamforming where substantially the same information symbol is transmitted from multiple antennas. The signals from each of the multiple antennas can be weighted differently such that the total signal to noise ratio at the receiver can be maximized. This different signal weighting can be accomplished using different antenna gains or by weighting the individual signals coupled to each of the antennas.

In the embodiment of FIG. 3, each of the G signal streams is separately beamformed using a plurality of antennas. Each of the distinct signal streams from the time diversity/space-time encoder 320 is coupled to one of a plurality of beamforming encoders, $330_0$-$330_G$. The number of beamforming encoders $330_0$-$330_G$ corresponds to the number of transmit diversity signal streams generated by the time diversity/space-time encoder 320.

Each beamforming encoder, e.g. $330_0$, is configured to generate a plurality of weighted signal streams, each of which is applied to a corresponding antenna. Each beamforming encoder, e.g. $330_0$, receives one of the plurality of signals streams from the transmit diversity/space-time encoder 320. The beamforming encoder $330_0$ splits the signal into a plurality, K, of duplicate signal streams and weights each of the K duplicate signal streams with an associated beamforming weight. The beamforming encoder $330_0$ couples the weighted signal streams to a plurality, K, of antennas $330_{00}$-$330_{0K}$ associated with the particular beamforming encoder $330_0$.

Therefore, the total number of antennas is equal to the number of time diversity/space-time encoded groups, G, multiplied by the number of beamforming signal streams, K, generated for each time diversity/space-time encoded group. In the embodiment of FIG. 3, there are a total of N=G×K antennas. The transmitter system 300 embodiment of FIG. 3 illustrates an equal number of beamforming signal streams for each of the time diversity/space-time signals. However, other embodiments can have different beamforming dimensions for different time diversity/space-time signals.

A weight matrix generator 360 is configured to generate the weight vectors used by each of the beamforming encoders $330_0$-$330_G$. Each vector within the weight matrix can correspond to one beamforming encoder, e.g. $330_0$. Typically, each of the weight vectors is distinct, but there is no requirement that the weight vectors be distinct.

Each of the weights, w, in a weight vector can have an associated amplitude, A, and phase rotation, $\phi$. The weight matrix generator 360 can be configured to generate a fixed weight matrix or can be configured to generate a variable weight matrix. In some embodiments, the weight matrix generator 360 can be configured to generate a combination of fixed weight vectors and variable weight vectors. The weight matrix generator 360 can be configured to vary the weights based on, for example, time, events, or a combination of time and events.

If estimates of the channel from the transmit antennas to a receiver are available at the transmitter, the weight matrix generator 360 can determine the optimal values for the weights in each weight vector that maximize the Signal to Noise Ratio (SNR). However, typically, the transmitter system 300, and thus the weight matrix generator 360, has no knowledge of estimates of the channel. In order to ensure that a receiver will continuously see a diversity benefit, the weight matrix generator 360 can be configured to change the weights over time such that the effective channel in each beam is also changing overtime, where the effective channel includes the actual channel in combination with the effects of the time varying beamforming. The variations in the weight vectors produced by the weight matrix generator 360 introduce varying beamforming that simulates the effect of fast fading.

In a weight vector, for example, $w_g=[w_{g1}\ w_{g2}\ \ldots\ w_{g,N/G}]$, each weight can include an amplitude component and a phase component, for example, $w_0=A_0 \cdot e^{j\phi_0}$. The weight matrix generator 360 can be configured to introduce intentional temporal variations in the vector weights in a number of ways. The weight matrix generator 360 can be configured to vary the amplitude components, phase components, or a combination thereof. Additionally, the weight matrix generator 360 can be configured to vary the weights within any given weight vector independently, or vary the weights based on, or as a function of, one of the weights.

As an example, the weight matrix generator 360 can be configured to maintain substantially constant amplitude components and vary the phase components as a function of time. For example, the weight matrix generator 360 can vary first and second phase components as functions of time, $\phi_0=\phi_0(t)$ and $\phi_1=\phi_1(t)$. The weight matrix generator 360 can independently vary the phase components of the individual weights, or can vary the phase component of a second phase component based on a first phase component, for example, $\phi_1(t)=\phi_0(t+\Delta)$.

As another example, the weight matrix generator 360 can be configured to maintain substantially constant phase components and vary the amplitude components of the various weights as a function of time. For example, the weight matrix generator 360 can keep $\phi_0$ and $\phi_1$ constant and can vary first and second amplitude components as functions of time, $A_0=A_0(t)$ and $A_1=A_1(t)$. The weight matrix generator 360 can independently vary the amplitude components of the individual weights, or can vary the amplitude component of a second amplitude component based on a first phase component, for example, $A_1(t)=A_0(t+\Delta)$. In another embodiment, the weight matrix generator 360 can be configured to vary both the amplitude and phase components of at least some of the beamforming weights.

The rate at which the weight matrix generator 360 varies the desired weight components can be fixed or can vary. The weight matrix generator 360 can be configured to vary the components based on time, events, or a combination thereof. The weight matrix generator 360 can be configured to use independent rates for each varied component when varying multiple weight components. Alternatively or additionally, the weight matrix generator 360 can be configured to use the same rate or independent rates for each of the vectors in the weight matrix. In general, the weight matrix generator 360 can be configured to vary the individual weight components and the rate at which the individual weight components are varied using completely independent functions for each component or rate.

The weight matrix generator 360 can implement a temporal variation that updates at a rate that is based on an OFDM symbol rate. For example, the weight matrix generator 360 can vary the weights in the weight matrix every frame of a predetermined number of OFDM symbols. In other embodiments, the weight matrix generator 360 can update the weights every symbol period, or can update the weights at the start of each super frame, where a super frame includes a plurality of frames.

For example, the weight matrix generator 360 can be configured to select a temporal variation rate for both the amplitude and phase of each of the weights to match a channel code used. Thus, the weight matrix generator 360 varies the weight components temporally, and the rate at which the weights are varied is dependent on an event, selection of the channel code. In another embodiment, the weight matrix generator 360 can be configured to select a rate of temporal variation used for both the amplitude and phase according to two different sets of predetermined functions corresponding to two different weights, $w_0$ and $w_1$. In yet another embodiment, the weight matrix generator 360 can be configured to select a function or changing rate based on a feedback from the receiver.

The timing and synchronization module 350 is configured to synchronize the timing of the weight matrix generator with the timing used in the transmitter 310. For example, the timing and synchronization module 350 can include a clock that is synchronized to system time used by the transmitter 310 when generating the transmit stream. In one embodiment, the timing and synchronization module can be synchronized to the OFDM symbol timing of the transmit stream such that the weight matrix generator 360 can generate time varying weights that vary on symbol boundaries.

The timing and synchronization module 350 can also monitor the transmitter 310 for the occurrence of one or more events that can be used as a trigger by the weight matrix generator 360 for varying the weights. For example, the timing and synchronization module 350 can monitor a coding rate used by the transmitter 310 and can generate an indicator or message for the weight matrix generator 360 indicating the coding rate, or indicating a change in coding rate.

Figure 4:
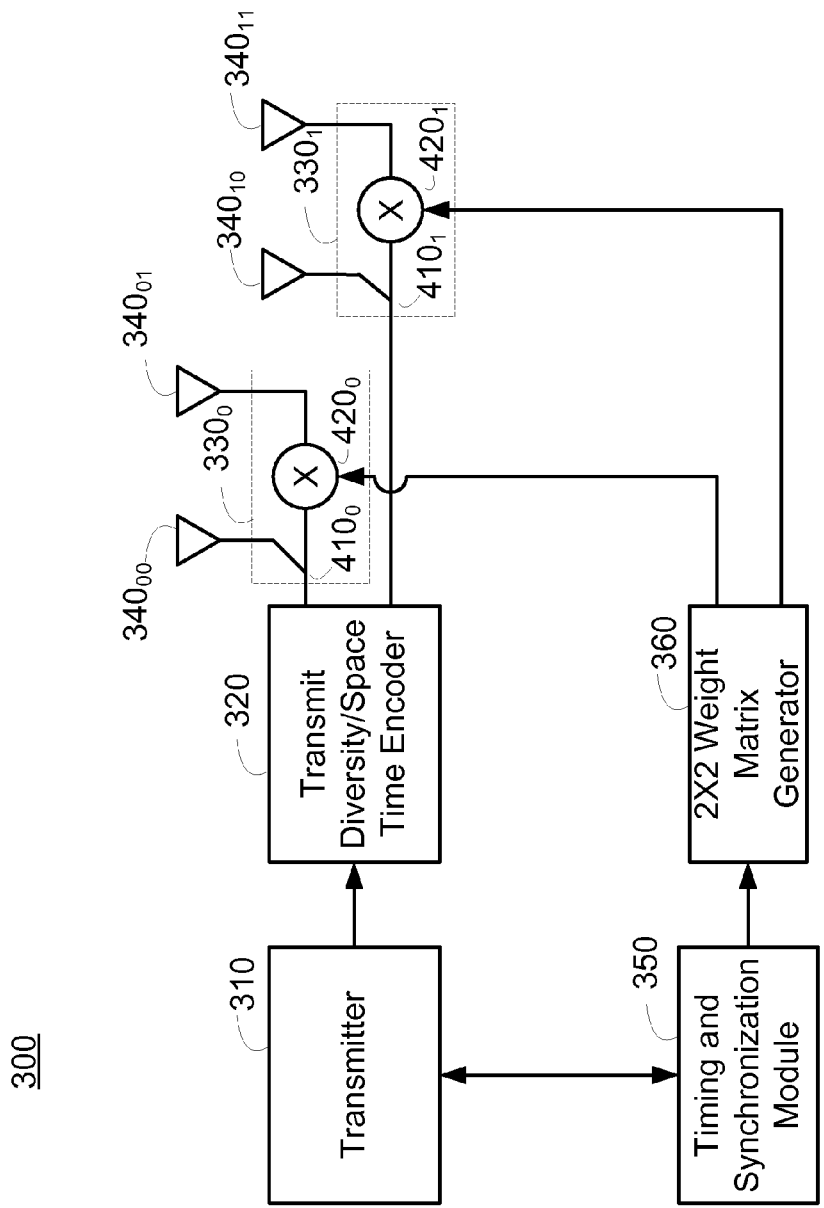
FIG. 4 is a simplified functional block diagram of an embodiment of a transmitter system having beamformed space-time coding transmit diversity.

FIG. 4 is a simplified functional block diagram of an embodiment of a transmitter system 300 configured for beamforming. In the embodiment of FIG. 4, the transmitter system 300 is configured with four total antennas and is configured to generate transmit diversity/space time coding over two distinct groups. The embodiment of FIG. 4 illustrates a particular embodiment of the generalized system illustrated in FIG. 3.

In the embodiment of FIG. 4, the transmitter 310 is configured to generate a transmit stream that can be, for example, a stream of a plurality of OFDM symbols frequency translated to a transmit RF frequency. The transmitter 310 couples the transmit stream to the transmit diversity/space-time encoder 320.

The transmit diversity/space-time encoder 320 is configured to generate a group of two encoded transmit streams from the input transmit stream. The transmit diversity/space-time encoder 320 can, for example, split the input transmit stream into two substantial duplicates. The transmit diversity/space-time encoder 320 can output a first of the two substantial duplicates as a first encoded transmit stream and can further process the second of the two substantial duplicates before outputting it as the second encoded transmit stream. The transmit diversity/space-time encoder 320 can process the second of the two substantial duplicates by, for example, delaying, conjugating, negating, rotating, and the like, or some combination thereof, the signal stream.

The transmitter system 300 beamforms each of the group of transmit diversity/space-time encoded signal streams. A first group of antennas includes antennas $340_{00}$ and $340_{01}$, while a second group includes antennas $340_{10}$ and $340_{11}$. The transmitter system 300 beamforms the first transmit diversity/space-time encoded signal stream using the first group of antennas $340_{00}$ and $340_{01}$, and beamforms the second transmit diversity/space-time encoded signal stream using the second group of antennas $340_{10}$ and $340_{11}$.

The transmit diversity/space-time encoder 320 couples the first encoded transmit stream to a first beamforming encoder $330_0$. The first beamforming encoder $330_0$ includes a signal splitter $410_0$ that is configured to split the first encoded transmit stream into two substantial duplicates. The first beamforming encoder $330_0$ couples a first output from the splitter $410_0$ to the first antenna $340_{00}$ associated with the transmit diversity group. The first beamforming encoder $330_0$ couples a second output from the splitter $410_0$ to a multiplier $420_0$, that is configured to weight the signal stream with a complex weight received from the weight matrix generator 360. The first beamforming encoder $330_0$ couples the weighted transmit stream to the second antenna $340_{01}$ associated with the transmit diversity group.

The transmitter system 300 beamforms the second encoded transmit stream in a similar fashion. The transmit diversity/space-time encoder 320 couples the second encoded transmit stream to a second beamforming encoder $330_1$. The second beamforming encoder $330_1$ includes a signal splitter $410_1$ that is configured to split the second encoded transmit stream into two substantial duplicates. The second beamforming encoder $330_1$ couples a first output from the splitter $410_1$ to the first antenna $340_{10}$. The second beamforming encoder $330_1$ couples a second output from the splitter $410_1$ to a multiplier $420_1$ that is configured to weight the signal stream with a complex weight received from the weight matrix generator 360. The second beamforming encoder $330_1$ couples the weighted transmit stream to the second antenna $340_{11}$.

A timing and synchronization module 350 is configured to synchronize with the system time used by the transmitter 310 when generating the transmit stream. The timing and synchronization module 350 can also be configured to monitor predetermined events or states of the transmitter 310. The timing and synchronization module 350 couples the timing and event status information to the weight matrix generator 360.

The weight matrix generator 360 is illustrated as a 2×2 weight matrix generator, because each transmit diversity group is beamformed over two distinct antennas. In the general case, the weight matrix generator 360 generates a 1×2 vector for each of the two transmit diversity groups, resulting in a 2×2 weight matrix. However, because the beamforming encoders $330_0$ and $330_1$ weight only one of the two signals routed to the antennas, the weight matrix generator 360 need only generate one complex weight for each transmit diversity group.

The weight matrix generator 360 effectively generates a 1×2 vector for each transmit diversity group in which the first entry is predetermined to be unity. Thus, there is only one variable complex weight for each transmit diversity group. The weights can be regarded as normalized to a first weight.

Figure 5:
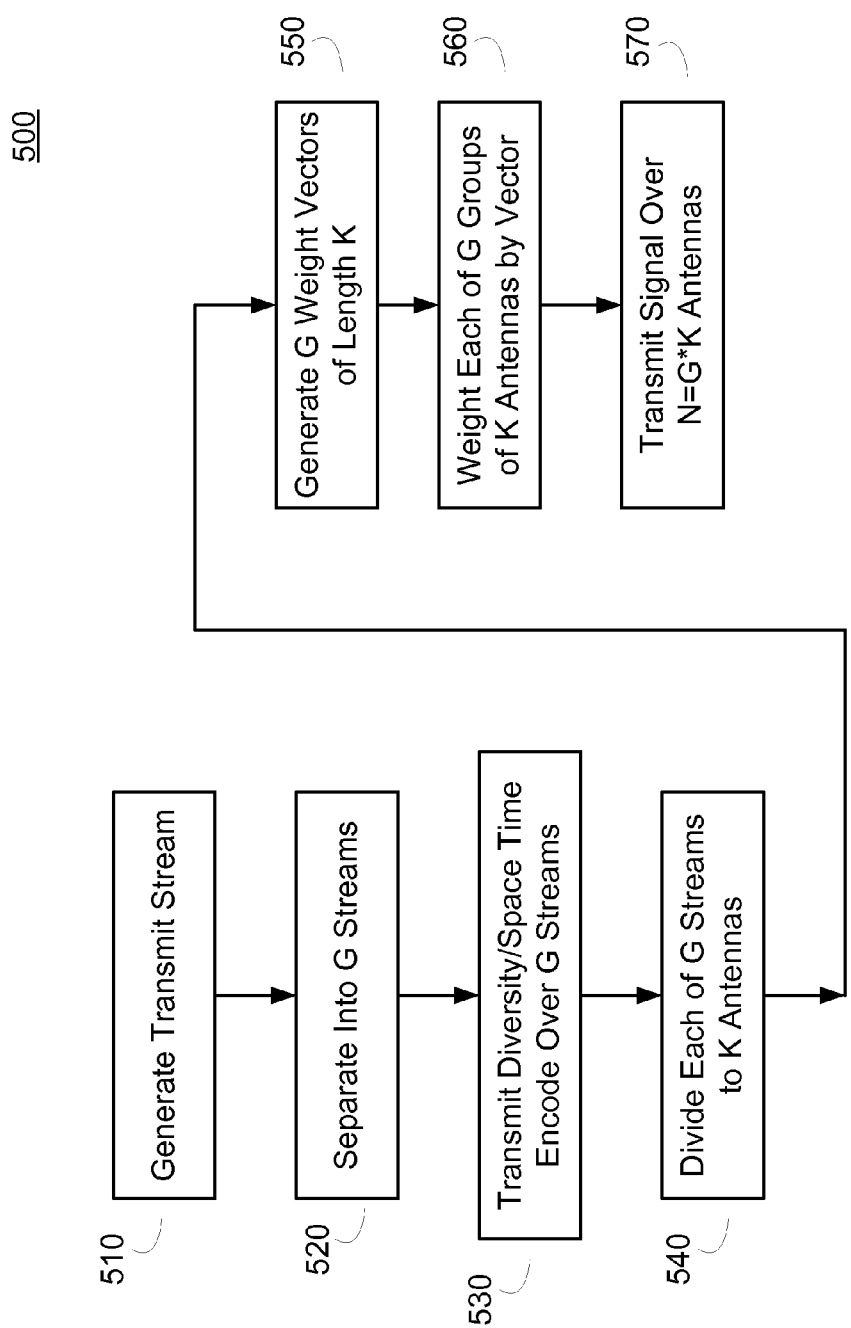
FIG. 5 is a simplified flowchart of an embodiment of a method of providing transmit diversity using beamformed transmit diversity/space-time coding.

FIG. 5 is a simplified flowchart of a method 500 of providing transmit diversity using beamformed transmit diversity/space-time coding. The method 500 can be performed, for example, at the base stations of FIG. 1 or by the transmitter systems shown in FIG. 3 or 4. The method 500 is described as being performed by a transmitter system for the purposes of discussion.

The method 500 begins at block 510 where the transmitter system generates a transmit stream. For example, the transmitter system can generate a transmit stream of OFDM symbols that have been frequency converted to a desired RF operating frequency. The transmitter system proceeds to block 520 and separates the transmit stream into G groups, where G represents an integer greater than one. As an example, the transmitter system can be configured to divide the transmit stream into G groups using a splitter.

The transmitter system proceeds to block 530 and time diversity/space time encodes the G signals streams. One or more of the G signal streams can be processed to introduce transmit diversity into the transmit stream. In one embodiment, the transmitter system can be configured to process or modify a signal stream by delaying, conjugating, negating, rotating, or otherwise processing the signals stream. Additionally, the transmitter system can implement a combination of a plurality of processing techniques when introducing transmit diversity.

After introducing transmit diversity, the transmitter system proceeds to block 540 and divides each encoded transmit signal from the G encoded signal streams into a group of K signals. The transmitter system can be configured, for example, to divide each of the encoded transmit streams into K signals using a 1:K signal splitter. Therefore, following the division at each of the G signal streams the transmitter system is configured to support N=G×K signals.

The method 500 is described as dividing each of the G signal streams into a group of K signals for the sake of clarity and ease of description. However, the method 500 is not limited to having an equal number of antennas in each group. Thus, in an alternative embodiment, the transmitter system may divide each of a first subset of the signals streams into groups of K1 signals while dividing each of a second subset of signals into groups of K2 signals, where K1 is not equal to K2. In another embodiment, the transmitter system may divide each of the G signal streams to a different number of substreams.

Once the transmitter system divides each of the G signal streams into a group of substreams, the transmitter system proceeds to block 550 and generates a weight vector for each of the G groups. In the embodiment illustrated in the flowchart, the transmitter system generates G weight vectors of length K. The transmitter system can generate distinct weight vectors for each of the G groups, or can use the same weight vector for a plurality of groups. Each of the weight vectors represents the weights used to beamform the group of K signal streams.

The transmitter system can be configured to generate static weight vectors or dynamic, varying weight vectors, or a combination of static and dynamic weight vectors. The transmitter system can be configured to vary the beamform weight vector based on time, events, or a combination of time and events. The temporal rate of variation can be based, for example, on an OFDM symbol rate, frame rate, super frame rate, or some other temporally varying rate.

The transmitter system can vary the one or more dynamic beamform weight vectors in an open-loop fashion, without feedback from a receiver, or in a closed loop fashion based on direct or indirect feedback from one or more receivers. The transmitter system can vary the beamform weight vectors, for example, based on a channel rate, coding type, or some other parameter that can be directly or indirectly influenced by a receiver. For example, the transmitter system can vary one or more weight vectors based in part on a selected channel code.

The transmitter system proceeds to block 560 and weights each of the K signal streams in each of the G groups based on the associated weight vector. The transmitter system proceeds to block 570 and transmits the signals over N=G×K antennas. Each group of K antennas transmits a beamformed representation of the corresponding signal stream from the group of G time diversity/space-time encoded signal streams. The transmitter system can continue to perform the method 500 for all transmitted information or can be configured to selectively activate and deactivate beamforming.

Figure 6:
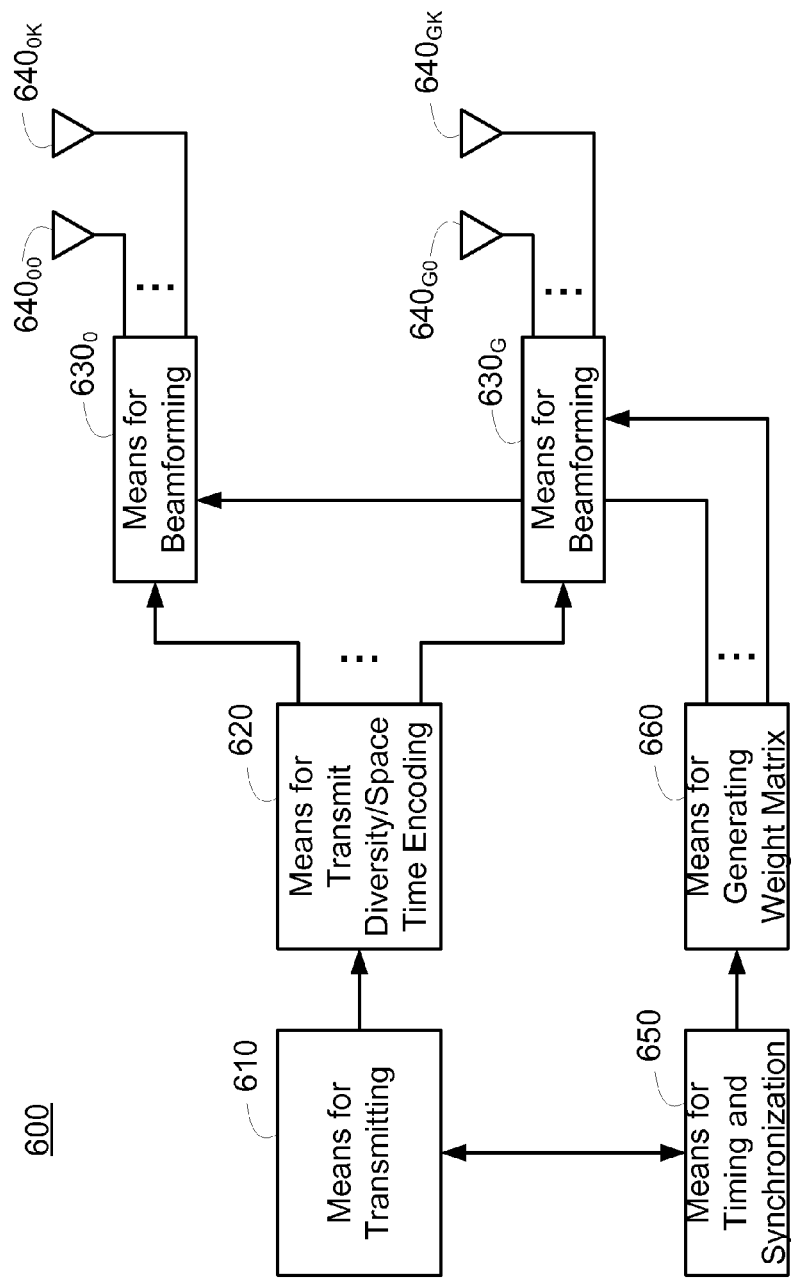
FIG. 6 is a simplified functional block diagram of an embodiment of a transmitter system having beamformed space-time coding transmit diversity.

FIG. 6 is a simplified functional block diagram of an embodiment of a transmitter system 600 configured for beamforming. The transmitter system 600 includes one or more processors for generating 610 that is configured to generate a transmit stream. The one or more processors for generating 610 can include, for example, a signal source, modulator, frequency converter, and the like. In one embodiment, the one or more processors for generating 610 is configured to generate a transmit stream of OFDM symbols frequency converted to a transmit frequency.

The one or more processors for generating 610 couples the transmit stream to one or more processors for transmit diversity/space-time encoding 620. The one or more processors for transmit diversity/space-time encoding 620 is configured to generate a plurality, G, of transmit diversity/space-time encoded signal streams from the input transmit stream. The one or more processors for transmit diversity/space-time encoding 620 generates the plurality of signal streams from the input transmit stream and encodes each of the G signal streams to introduce transmit diversity.

The one or more processors for transmit diversity/space-time encoding 620 can include, for example, one or more elements configured to delay, conjugate, negate, rotate, or otherwise process a signal stream.

The one or more processors for transmit diversity/space-time encoding 620 couples each of the plurality of encoded transmit streams to a corresponding plurality of one or more processors for beamforming, $630_0$-$630_G$. The transmitter system 600 separately beamforms each of the encoded transmit streams, and thus, implements a one or more processors for beamforming, e.g. $630_0$, for each encoded transmit stream.

Each processor for beamforming, e.g. $630_0$, separates its corresponding encoded transmit stream into a plurality of K beamforming substreams. The one or more processors for beamforming, e.g. $630_0$, weights the K beamforming substreams with a weight from a corresponding beamforming weight vector provided by a means for generating a weight matrix 660.

The one or more processors for beamforming, e.g. $630_0$, couples the K weighted beamforming substreams to a plurality of corresponding antennas, e.g. $640_{00}$-$640_{0K}$, where the beamformed signals are transmitted to one or more receivers.

The one or more processors for generating a weight matrix 660 generates a weight vector for each of the one or more processors for beamforming, $630_0$-$630_G$. In general, the one or more processors for generating a weight matrix 660 generates a weight for each antenna and thus generates a vector of dimension K for each one or more processors for beamforming, $630_0$-$630_G$. The one or more processors for generating a weight matrix 660 can generate a distinct weight vector for each of the means for beamforming, $630_0$-$630_G$, or can supply the same weight vector to two or more means for beamforming.

The one or more processors for generating a weight matrix 660 can be configured to generate fixed weight vectors or variable weight vectors. The one or more processors for generating a weight matrix 660 can vary each weight in a variable weight vector, or can vary a subset of the weights in a variable weight vector.

The one or more processors for generating a weight matrix 660 can vary a weight vector temporally, based on events, or based on a combination of events and time. A one or more processors for timing and synchronization 650 can be configured to monitor the one or more processors for generating 610 for the occurrence or lack of occurrence of events, and can be configured to synchronize a time with a time reference used by the one or more processors for generating 610. For example, the one or more processors for timing and synchronization 650 can be configured to synchronize with a system time or a symbol time.

The one or more processors for timing and synchronization 650 couples the information relating to events and timing synchronization to the means for generating the weight matrix 660. The one or more processors for generating the weight matrix 660 can be configured to vary one or more weight vectors, for example, using a predetermined function, table, or combination of functions and tables that are related to the information provided by the one or more processors for timing and synchronization 650.

Using the methods and apparatus described herein enables a communication system to benefit from both transmit diversity/space-time encoding and beamforming. A transmitter system can operate to separately beamform each of a group of transmit diversity/space-time encoded signals. The transmitter system can vary the beamforming for each encoded signal stream from the group of transmit diversity/space-time encoded signals. The transmitter system can vary the beamforming for each signal stream temporally. The transmitter system can vary the beamforming in an open loop manner that is independent of the channel characteristics or signal quality at the receiver.

As used herein, the term coupled or connected is used to mean an indirect coupling as well as a direct coupling or connection. Where two or more blocks, modules, devices, or apparatus are coupled, there may be one or more intervening blocks between the two coupled blocks.

The various illustrative logical blocks, modules, and circuits described in connection with the embodiments disclosed herein may be implemented or performed with a general purpose processor, a digital signal processor (DSP), a Reduced Instruction Set Computer (RISC) processor, an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The methods, process, or algorithm described in one or more exemplary embodiments, may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The above description of the disclosed embodiments is provided to enable any person of ordinary skill in the art to make or use the disclosure. Various modifications to these embodiments will be readily apparent to those of ordinary skill in the art, and the generic principles defined herein may be applied to other embodiments without departing from the spirit or scope of the disclosure. Thus, the disclosure is not intended to be limited to the embodiments shown herein but is to be accorded the widest scope consistent with the principles and novel features disclosed herein.

What is claimed is:

1. A transmitter comprising:
    a generator configured to generate a transmit signal stream;
    a transmit diversity encoder configured to receive the transmit signal stream and configured to generate a plurality, in number G, of transmit diversity/space-time encoded transmit streams from the transmit signal stream;
    a timing and synchronization module configured to generate a timing reference;
    a weight matrix generator configured to generate a plurality of weight vectors including at least one varying weight vector, wherein the weight matrix generator is configured to vary the at least one varying weight vector using the timing reference; and
    a plurality of beamforming encoders, each of the plurality of beamforming encoders configured to receive one of the plurality of transmit diversity/space-time encoded transmit streams and generate a plurality, in number K, of weighted substreams from the one of the plurality of transmit diversity/space-time encoded transmit streams by weighting the one of the plurality of transmit diversity/space-time encoded transmit streams by a corresponding weight vector of the plurality of weight vectors, wherein each weighted substream of the plurality of weighted substreams is configured to couple with a respective antenna of a plurality, in equal number K, of antennas independently of every other weighted substream in the plurality of weighted substreams.

2. The transmitter of claim 1, wherein the at least one varying weight vector comprises a time varying weight vector.

3. The transmitter of claim 1, wherein the at least one varying weight vector comprises a weight vector determined based on a transmitter event.

4. The transmitter of claim 1, wherein the weight matrix generator is configured to generate at least one complex weight vector.

5. The transmitter of claim 1, wherein the weight matrix generator is configured to generate a distinct complex weight vector for each of a plurality of access terminals.

6. The transmitter of claim 1, wherein at least one of the plurality of beamforming encoders is configured to split a received encoded transmit stream into K substreams and weight at least one of the K substreams by an element from a complex weight vector.

7. The transmitter of claim 1, wherein the transmit stream comprises Orthogonal Frequency Division Multiplex (OFDM) symbols frequency converted to an operating frequency.

8. The transmitter of claim 1, wherein the transmit diversity encoder is configured to delay a version of the transmit stream as at least part of the process of generating a transmit diversity/space-time encoded transmit stream.

9. The transmitter of claim 1, wherein the transmit diversity encoder is configured to conjugate a version of the transmit stream as at least part of the process of generating a transmit diversity/space-time encoded transmit stream.

10. The transmitter of claim 1, wherein the transmit diversity encoder is configured to rotate a version of the transmit stream as at least part of the process of generating a transmit diversity/space-time encoded transmit stream.

11. A method of introducing transmit diversity, the method comprising:
generating a transmit signal stream;
generating by a transmit diversity encoder, a plurality, in number G, of transmit diversity/space-time encoded transmit streams from the transmit signal stream;
generating a timing reference;
generating a plurality of weight vectors including at least one varying weight vector, wherein the at least one varying weight vector is varied using the timing reference;
beamforming each of the plurality of transmit diversity/space-time encoded transmit streams to generate a plurality, in number K, of weighted streams from the each of the plurality of transmit diversity/space-time encoded transmit streams by weighting the each of the plurality of transmit diversity/space-time encoded transmit streams by a corresponding weight vector of the plurality of weight vectors, wherein each weighted substream of the plurality of weighted substreams is configured to couple with a respective antenna of a plurality, in equal number K, of antennas independently of every other weighted substream in the plurality of weighted substreams; and
transmitting each weighted substream.

12. The method of claim 11, wherein transmit diversity/space-time encoding the G signal streams comprises time delaying at least one of the G signal streams relative to a first of the G signal streams.

13. The method of claim 11, wherein transmit diversity/space-time encoding the G signal streams comprises conjugating at least one of the G signal streams relative to a first of the G signal streams.

14. The method of claim 11, wherein transmit diversity/space-time encoding the G signal streams comprises rotating at least one of the G signal streams relative to a first of the G signal streams.

15. The method of claim 11, wherein the varying weight vector comprises a predetermined time varying beamforming vector.

16. The method of claim 11, wherein weighting each of the K substreams comprises multiplying a substream by a complex weight from the corresponding weight vector.

17. A transmitter comprising:
means for generating a transmit signal stream;
means for generating a plurality, in number G, of transmit diversity/space-time encoded transmit streams from the transmit signal stream;
means for generating a timing reference;
means for generating a plurality of weight vectors including at least one varying weight vector, wherein the means for generating the plurality of weight vectors comprises means for varying the at least one varying weight vector using the timing reference;
means for beamforming each of the plurality of transmit diversity/space-time encoded transmit streams to generate a plurality, in number K, of weighted substreams from the each of the plurality of transmit diversity/space-time encoded transmit streams by weighting the each of the plurality of transmit diversity/space-time encoded transmit streams by a corresponding weight vector of the plurality of weight vectors, wherein each weighted substream of the plurality of weighted substreams is configured to couple with a respective antenna of a plurality, in equal number K, of antennas independently of every other weighted substream in the plurality of weighted substreams; and
a plurality of K antennas for transmitting each weighted substream.

18. The transmitter of claim 17, wherein the means for transmit diversity/space-time encoding the transmit stream comprises an element configured to generate at least one of a delayed, conjugated, rotated, or negated signal stream from the transmit stream.

19. A non-transitory computer readable media including instructions thereon configured to cause a device to provide transmit diversity, the instructions comprising:
instructions for generating a transmit signal stream;
instructions for generating a plurality, in number G, of transmit diversity/space-time encoded transmit streams from the transmit signal stream;
instructions for generating a timing reference;
instructions for generating a plurality of weight vectors including at least one varying weight vector, wherein the instructions for generating the plurality of weight vectors include instructions for varying the at least one varying weight vector using the timing reference; and
instructions for beamforming each of the plurality of transmit diversity/space-time encoded transmit streams to generate a plurality, in number K, of weighted substreams from the each of the plurality of transmit diversity/space-time encoded transmit streams by weighting the each of the plurality of transmit diversity/space-time encoded transmit streams by a corresponding weight vector of the plurality of weight vectors, wherein each weighted substream of the plurality of weighted substreams is configured to couple with a respective antenna of a plurality, in equal number K, of antennas independently of every other weighted substream in the plurality of weighted substreams; and
instruction for transmitting each weighted substream.

20. The transmitter of claim 1, wherein the timing and synchronization module is configured to:
monitor the generator for an occurrence of one or more events; and
generate the timing reference based on the occurrence or lack of occurrence of the one or more events.

21. The method of claim 11, further comprising:
monitoring for an occurrence of one or more events,
wherein the timing reference is generated based on the occurrence or lack of occurrence of the one or more events.

22. The transmitter of claim 17, wherein the means for generating a timing reference comprises:
means for monitoring the means for generating a transmit signal stream for an occurrence of one or more events; and
means for generating the timing reference based on the occurrence or lack of occurrence of the one or more events.

23. The non-transitory computer readable media of claim 19, wherein the instructions for generating a timing reference comprise:
instructions for monitoring for an occurrence of one or more events; and
instructions for generating the timing reference based on the occurrence or lack of occurrence of the one or more events.

* * * * *